US012298471B2

(12) United States Patent
Kajiya

(10) Patent No.: US 12,298,471 B2
(45) Date of Patent: May 13, 2025

(54) DISPLAY PANEL AND OPTICAL FILM

(71) Applicant: Dexerials Corporation, Tokyo (JP)

(72) Inventor: Shunichi Kajiya, Tagajo (JP)

(73) Assignee: Dexerials Corporation, Tokyo (JP)

( * ) Notice: Subject to any disclaimer, the term of this patent is extended or adjusted under 35 U.S.C. 154(b) by 768 days.

(21) Appl. No.: 17/204,400

(22) Filed: Mar. 17, 2021

(65) Prior Publication Data

US 2021/0197505 A1 Jul. 1, 2021

Related U.S. Application Data

(62) Division of application No. 16/062,842, filed as application No. PCT/JP2016/087643 on Dec. 16, 2016, now Pat. No. 10,987,884.

(30) Foreign Application Priority Data

Dec. 18, 2015 (JP) .................. 2015-247855

(51) Int. Cl.
*G02B 1/111* (2015.01)
*B29D 11/00* (2006.01)
(Continued)

(52) U.S. Cl.
CPC .......... *G02B 1/111* (2013.01); *B29D 11/0074* (2013.01); *B32B 7/023* (2019.01);
(Continued)

(58) Field of Classification Search
CPC ........... G02B 1/11; G02B 1/111; G02B 1/118; G02B 5/00; G02B 5/021; B32B 7/023;
(Continued)

(56) References Cited

U.S. PATENT DOCUMENTS

2009/0120566 A1* 5/2009 Okayama .............. G02B 1/118
156/230
2011/0123777 A1 5/2011 Imaoku et al.
(Continued)

FOREIGN PATENT DOCUMENTS

CN 101802651 A 8/2010
CN 202013889 U 10/2011
(Continued)

OTHER PUBLICATIONS

Aug. 19, 2020, Office Action issued by the Taiwan Intellectual Property Office in the corresponding Taiwanese Patent Application No. 105141753.

(Continued)

*Primary Examiner* — Jyotsna V Dabbi

(74) *Attorney, Agent, or Firm* — KENJA IP LAW PC

(57) ABSTRACT

An optical film includes: a fine recess-protrusion layer having a recess-protrusion pattern, formed on a substrate film; and a fine structure body formed on the fine recess-protrusion layer. The optical film is pressed by a light guide transparent to light against one surface of an adherend applied with a photocurable resin, and light is transmitted through the light guide to cure the photocurable resin with the optical film being pressed by the light guide, thereby forming the fine structure body on the adherend.

1 Claim, 12 Drawing Sheets

(51) Int. Cl.
  B32B 7/023 (2019.01)
  B32B 7/06 (2019.01)
  B32B 9/00 (2006.01)
  G02B 1/118 (2015.01)
  G02B 5/00 (2006.01)
  G02B 5/02 (2006.01)
  B29K 33/04 (2006.01)
  B32B 17/10 (2006.01)
(52) U.S. Cl.
  CPC .................. *B32B 7/06* (2013.01); *B32B 9/00* (2013.01); *G02B 1/118* (2013.01); *G02B 5/00* (2013.01); *G02B 5/021* (2013.01); *B29K 2033/04* (2013.01); *B32B 17/10165* (2013.01); *B32B 17/10587* (2013.01); *B32B 17/10743* (2013.01)
(58) Field of Classification Search
  CPC ................ B32B 7/06; B32B 17/10165; B32B 17/10587; B32B 17/10743; B32B 8/00; B32B 3/30; B32B 27/00; B32B 37/10; B32B 43/006; B32B 2038/0076; B29D 11/0074; B29K 2033/04
  USPC ........................................................ 359/601
  See application file for complete search history.

(56) References Cited

U.S. PATENT DOCUMENTS

| | | | | |
|---|---|---|---|---|
| 2012/0100346 A1* | 4/2012 | Tazawa | .................. | G02B 1/118 428/161 |
| 2014/0124967 A1* | 5/2014 | Ozaki | ..................... | B29C 43/50 264/2.7 |
| 2014/0205801 A1* | 7/2014 | Iwata | .................. | C08F 222/103 264/494 |

FOREIGN PATENT DOCUMENTS

| | | | |
|---|---|---|---|
| CN | 102744877 | A | 10/2012 |
| CN | 104411494 | A | 3/2015 |
| CN | 104755259 | A | 7/2015 |
| CN | 105074512 | A | 11/2015 |
| JP | 2003090902 | A | 3/2003 |
| JP | 2003098304 | A | 4/2003 |
| JP | 2010018644 | A | 1/2010 |
| JP | 2011093279 | A | 5/2011 |
| JP | 2012113071 | A | 6/2012 |
| JP | 2012227298 | A * | 11/2012 ........... B29C 33/424 |
| JP | 2013000961 | A | 1/2013 |
| JP | 2015108882 | A | 6/2015 |
| KR | 1020120123193 | A | 11/2012 |
| KR | 1020130026450 | A | 3/2013 |
| TW | 200848789 | A | 12/2008 |
| WO | 2013183601 | A1 | 12/2013 |
| WO | WO-2014148118 | A1 * | 9/2014 ............ G01N 21/31 |
| WO | 2014163185 | A1 | 10/2014 |

OTHER PUBLICATIONS

Aug. 9, 2019, the Extended European Search Report issued by the European Patent Office in the corresponding European Patent Application No. 16875805.0.

Jan. 15, 2021, the Extended European Search Report issued by the European Patent Office in the corresponding European Patent Application No. 20202610.0.

Jul. 5, 2018, International Preliminary Report on Patentability issued in the International Patent Application No. PCT/JP2016/087643.

Jun. 6, 2019, Office Action issued by the China National Intellectual Property Administration in the corresponding Chinese Patent Application No. 201680072490.3.

Mar. 14, 2017, International Search Report issued in the International Patent Application No. PCT/JP2016/087643.

Sep. 24, 2019, Notification of Reasons for Refusal issued by the Japan Patent Office in the corresponding Japanese Patent Application No. 2015-247855.

Apr. 15, 2021, Office Action issued by the China National Intellectual Property Administration in the corresponding Chinese Patent Application No. 202010185204.2.

Jun. 28, 2023, Office Action issued by the Korean Intellectual Property Office in the corresponding Korean Patent Application No. 10-2018-7016400.

Dec. 2, 2021, Office Action issued by the China National Intellectual Property Administration in the corresponding Chinese Patent Application No. 202010185204.2.

Dec. 13, 2022, Office Action issued by the China National Intellectual Property Administration in the corresponding Chinese Patent Application No. 202010185204.2.

* cited by examiner

DISPLAY PANEL AND OPTICAL FILM

CROSS-REFERENCE TO RELATED APPLICATIONS

This application is a divisional application of U.S. application Ser. No. 16/062,842 filed Jun. 15, 2018, which is a National Stage Application of PCT/JP2016/087643 filed Dec. 16, 2016, which claims priority to Japanese Patent Application No. 2015-247855 filed on Dec. 18, 2015. The disclosures of the prior applications are hereby incorporated by reference herein in their entirety.

TECHNICAL FIELD

This disclosure relates to a method of forming an antireflection optical body, a display panel, and an optical film.

BACKGROUND

Many electronic devices such as notebook personal computers (PCs), tablet PCs, smart phones, and mobile telephones include an image sensor (first image sensor) at a surface that is on the opposite side of the device to a surface side at which a display for displaying images is located (display surface side). These electronic devices enable a user to capture an image with the first image sensor while checking the captured image on the display in situations such as when capturing an image of a landscape.

In recent years, electronic devices that also include an image sensor (second image sensor) at the display surface side thereof have become common. These electronic devices improve usability by enabling a user to capture an image with the second image sensor while checking the captured image on the display in situations such as when the user takes a self-portrait.

In the case of an electronic device having an image sensor at the display surface side thereof as described above, a transparent area is provided in a section of the display panel and the image sensor (second image sensor) is located directly below this transparent area. In this configuration, light that is reflected by a lens of the image sensor may also be reflected by the display panel such as to once again be incident on the lens of the image sensor, resulting in the formation of a ghost. In order to inhibit the formation of a ghost, improve transmittance, and so forth, a region of the display panel corresponding to the image sensor (second image sensor) may be subjected to antireflection treatment to form a fine structure body (antireflection optical body) and thereby prevent reflection of light.

In one example of a technique for antireflection treatment (first technique), an adherend (display panel etc.) is introduced into a vacuum chamber, and a dielectric film is formed as an antireflection film (AR) on the adherend by wet coating such as dip coating.

In another example (second technique), a film having a fine structure and an adhesive body are attached by a roll-to-roll method, and then the film is attached to an adherend through the adhesive body.

In a yet another technique, PTL 1 and PTL 2 disclose a technique (third technique) in which an antireflection transfer film obtained by forming a transparent resin layer as a transfer layer on a releasable film having recesses and protrusiones, and the transfer layer on the antireflection transfer film is transferred onto a base plate. In PTL 1, a resin in a fluidized state is applied to the releasable film, and after the resin is cured, the releasable film is peeled off to form a fine structure body a base plate formed from the cured resin. Further, in PTL 2, the transparent resin layer of the antireflection transfer film and the base plate are joined together by roller transfer, simultaneous injection molding and transfer, or the like, the releasable film is then peeled off; thus, the fine structure body is formed on the base plate.

CITATION LIST

Patent Literature

PTL 1: JP 2003-090902 A
PTL 2: JP 2003-098304 A

SUMMARY

Technical Problem

When considering application in electronic devices, there is demand for reducing the thickness of the structure (to the order of 10 μm or less) and for partial treatment rather than treatment on the entire surface of an adherend (display panel).

In the first technique, performing antireflection coating treatment only on part of the adherend also requires an adherend having a large area to be introduced into a vacuum chamber. Therefore, using the first technique to perform antireflection treatment only on part of an adherend is not realistic.

Further, in the second technique, since a film having a fine structure body and an adherent are joined together using roll-to-roll processing, the combined thickness of the film and the adhesive body is required to be at least 50 μm when ease of handling, strength, and so forth are taken into account. Therefore, it is difficult to achieve thickness-reduction in the first technique.

Further, with respect to the third technique, in both PTLs 1 and 2, any specific method of forming an antireflection optical body having a fine structure body only on part of an adherend is not considered.

In view of the above problems, it could therefore be helpful to provide a method of forming an antireflection optical body, which makes it possible to form an antireflection optical body on only part of an adherend while reducing the thickness of the optical body; a display panel; and an optical film.

Solution to Problem

In order to solve the problems set forth above, a method of forming an antireflection optical body according to this disclosure comprises: an application step of applying a photocurable resin onto one surface side of the adherend; a pressing step of pressing a substrate film having a fine structure body at one surface side thereof against the photocurable resin from an opposite surface side to the one surface side by a light guide transparent to light; a curing step of curing the photocurable resin by transmitting light through the light guide with the substrate film being pressed by the light guide; and a peeling separation step of releasing the pressing of the substrate film and peeling fixed fine structure body that is fixed to the adherend through the cured photocurable resin from the substrate film while separating the fixed fine structure body from fine structure body on the substrate film other than at a location fixed through the photocurable resin such that the fixed fine structure body is formed on the adherend as an antireflection optical body.

One of the disclosed aspects provides a method of forming an antireflection optical body, comprising: a pressing step of pressing a substrate film having a fine structure body at one surface side with a photocurable resin layer in a semi-cured state being formed on the fine structure body, against the adherend from an opposite surface side to the one surface side by a light guide transparent to light; a curing step of curing the photocurable resin layer by transmitting light through the light guide with the substrate film being pressed by the light guide; and a peeling separation step of releasing the pressing of the substrate film and peeling fixed fine structure body that is fixed to the adherend through the cured photocurable resin layer from the substrate film while separating the fixed fine structure body from fine structure body on the substrate film other than at a location fixed through the photocurable resin layer such that the fixed fine structure body is formed on the adherend as an antireflection optical body.

Also, in the method of forming an antireflection optical body according to this disclosure, the fine structure body has a fine structure at one surface at a side corresponding to the substrate film and a fine structure at a surface at an opposite side to the one surface.

Furthermore, in the method of forming an antireflection optical body according to this disclosure, it is preferable that a fine recess-protrusion layer having a recess-protrusion pattern is located on the substrate film, an inorganic film is located on the fine recess-protrusion layer, and the fine structure body is located on the inorganic film.

Moreover, in the method of forming an antireflection optical body according to this disclosure, the fine structure preferably has a thickness of 10 μm or less and has a recess-protrusion pattern with a pitch that is not more than visible light wavelength. a recess-protrusion pattern with a pitch that is not more than visible light wavelength.

Furthermore, in the method of forming an antireflection optical body according to this disclosure, the substrate film is pressed against the adherend with a pressure of 0.5 MPa or more.

Moreover, in the method of forming an antireflection optical body according to this disclosure, the antireflection optical body is transparent to ultraviolet light.

Further, in order to solve the problems set forth above, in which the fine structure body is only partially formed by any one of the above the methods of forming an antireflection optical body.

Further, in order to solve the problems set forth above, an optical film comprising: a fine recess-protrusion layer having a recess-protrusion pattern, formed on a substrate film; and a fine structure body formed on the fine recess-protrusion layer, wherein the optical film is pressed by a light guide transparent to light against one surface side of an adherend applied with a photocurable resin, and light is transmitted through the light guide to cure the photocurable resin with the optical film being pressed by the light guide, thereby forming the fine structure body on the adherend.

Further, in order to solve the problems set forth above, an optical film comprising: a fine recess-protrusion layer having a recess-protrusion pattern, formed on a substrate film; a fine structure body formed on the fine recess-protrusion layer; and a photocurable resin layer made of a semi-cured photocurable resin, formed on the fine structure body, wherein the optical film is pressed by a light guide transparent to light against one surface side of an adherend, and light is transmitted through the light guide with the optical film being pressed by the light guide, thereby forming the fine structure body on the one surface side of the adherend.

Moreover, in the optical film according to this disclosure, it is preferable that the optical film further includes an inorganic film formed between the fine recess-protrusion layer and the fine structure body.

Moreover, in the optical film according to this disclosure, it is preferable that the fine structure body is formed on one surface side of the substrate film and an opposite surface side to the said one surface side.

Advantageous Effect

Through the method of forming an antireflection optical body, a display panel and an optical film according to this disclosure, it is possible to form an antireflection optical body on only part of an adherend while enabling thickness-reduction.

DETAILED DESCRIPTION

Figure 1A:
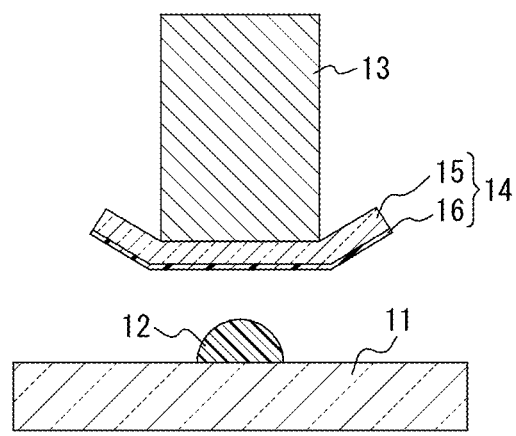
FIG. 1A illustrates an application step in a method of forming an antireflection optical body according to a first embodiment of this disclosure.

The following describes an embodiment of this disclosure with reference to the drawings. However, this disclosure is not limited to just the following embodiment and various alterations may of course be made without deviating from the essence of this disclosure. Note that configurations that are the same are marked with the same reference sign in the drawings and repeated explanation thereof is omitted.

First Embodiment

FIGS. 1A to 1D illustrate a method of forming an antireflection optical body according to an embodiment of this disclosure. The method of forming an antireflection optical body according to the present embodiment includes an application step, a pressing step, a curing step, and a peeling separation step.

In the application step illustrated in FIG. 1A, a UV curable resin 12 is applied as a photocurable resin onto an adherend 11. Further, an optical film 14 is held by a light guide 13 which can transmit light (light capable of curing the UV curable resin 12). The optical film 14 has a fine structure body 16 (thin optical body layer) transparent to ultraviolet light (UV light) at one surface side of a substrate film 15. The optical film 14 is held such that the one surface side at which the fine structure body 16 is located faces toward the adherend 11. When the average of the reflectance with respect to a wavelength range of 350 nm to 450 nm measured using a spectrophotometer with the fine structure body 16 being formed on the substrate film 15 was 2%, the curing of the UV curable resin 12 to be described was insufficient, and when 7%, sufficient curing of the UV curable resin 12 and sufficient adhesion were achieved. Accordingly, the fine structure body 16 being transparent to ultraviolet light means that the average reflectance with respect to a wavelength range of 350 nm to 450 nm is 7% or more.

Configuration of the optical film 14 illustrated in FIG. 1A is described in more detail with reference to FIG. 2.

Figure 1B:
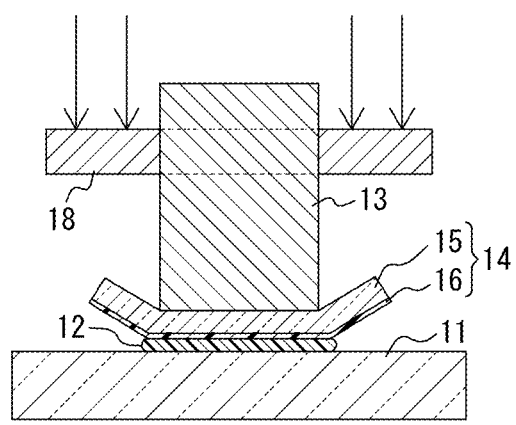
FIG. 1B illustrates a pressing step in a method of forming an antireflection optical body according to the first embodiment of this disclosure.
Figure 1C:
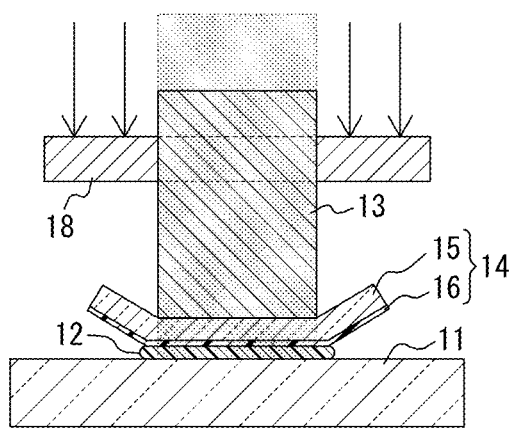
FIG. 1C illustrates a curing step in a method of forming an antireflection optical body according to the first embodiment of this disclosure.
Figure 1D:
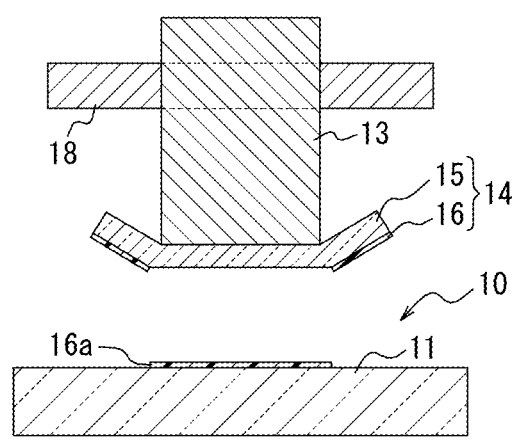
FIG. 1D illustrates a peeling separation step in a method of forming an antireflection optical body according to the first embodiment of this disclosure.
Figure 2:
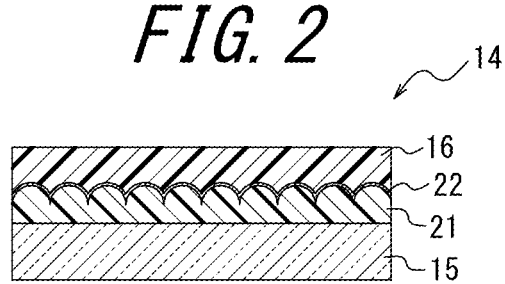
FIG. 2 illustrates an example of configuration of an optical film illustrated in FIGS. 1A to 1D.

As depicted in FIG. 2, the optical film 14 includes the substrate film 15, a fine recess-protrusion layer, an inorganic film 22, and the fine structure body 16 (thin-film optical body layer). Note that the fine recess-protrusion layer 21 and the inorganic film 22 are omitted in FIGS. 1A to 1D for simplicity of illustration.

The substrate film 15 is provided to protect the fine structure body 16 and the like and to improve protection and handleability of the fine structure body 16 etc. Although no specific limitations are placed on the type of substrate film 15, it is preferably a transparent and fracture-resistant film. For the substrate film 15, for example, a polyethylene terephthalate (PET) film or a triacetyl cellulose (TAC) film, or the like may be used. The thickness of the substrate film 15 can be adjusted as appropriate depending on the required handleability of the optical film 14 and may, for example, be 50 μm to 125 μm.

The fine recess-protrusion layer is located on one surface of the substrate film 15. A recess-protrusion pattern (protrusions protruding in thickness direction of optical film 14 and recesses receding in thickness direction of optical film 14) is present at the surface of the fine recess-protrusion layer 21. The protrusions and recesses may be positioned periodically (for example, in a staggered grid or a rectangular grid) or may be positioned randomly. Moreover, the shape of the protrusions and the recesses is not specifically limited and may be bullet-shaped, cone-shaped, column-shaped, needle-shaped, or the like. Note that the shape of the recesses refers to the shape defined by the internal walls of the recesses.

The average period (pitch) of the recess-protrusion pattern at the surface of the fine recess-protrusion layer 21 is not more than visible light wavelength (for example, 830 nm or less), and is preferably at least 100 nm and not more than 350 nm, and more preferably at least 150 nm and not more than 280 nm. Accordingly, the surface of the fine recess-protrusion layer 21 has a structure that is referred to as a "moth-eye structure". Setting the pitch of the recess-protrusion pattern at the surface of the fine recess-protrusion layer 21 as not more than visible light wavelength enables improvement of antireflection properties.

The average period of the recess-protrusion pattern of the fine recess-protrusion layer 21 is an arithmetic mean value of the distances between adjacent protrusions and adjacent recesses. The recess-protrusion pattern of the fine recess-protrusion layer 21 can be observed, for example, using a scanning electron microscope (SEM) or a cross-section transmission electron microscope (cross-section TEM). The method by which the average period is calculated may, for example, be a method in which a plurality of combinations of adjacent protrusions and a plurality of combinations of adjacent recesses are selected, the distances between the protrusions and the distances between the recesses in these combinations are measured, and the measured values are averaged.

Although no specific limitations are placed on the height of the protrusions (depth of the recesses) in the fine recess-protrusion layer 21, the protrusion height is preferably at least 150 nm and not more than 300 nm, more preferably at least 190 nm and not more than 300 nm, and even more preferably at least 190 nm and not more than 230 nm.

The inorganic film 22 is formed from an inorganic material such as tungsten oxide, silicon oxide, silicon, or ITO. The inorganic film 22 is formed on the surface of the fine recess-protrusion layer 21 with a thickness of approximately 20 nm. The inorganic film 22 is provided as a release layer for facilitating peeling of the fine structure body 16.

The fine structure body 16 is a thin-film optical body layer that is located on the inorganic film 22. A recess-protrusion pattern that is the reverse of the recess-protrusion pattern of the fine recess-protrusion layer 21 is located at the surface of the fine structure body 16 at a side corresponding to the inorganic film 22. The surface of the fine structure body 16 at the opposite side thereof relative to the inorganic film 22 is flat. The thickness of the fine structure body 16 is desirably 10 μm or less. When the thickness of the fine structure body 16 exceeds 10 μm, the fine structure body 16 fixed to the adherend 11 can hardly be separated from the portion of the fine structure body 16 on the substrate film 15 other than the fixed portion as will be described in more detail below.

A method of producing the optical film 14 illustrated in FIG. 2 is described with reference to FIGS. 3A to 3C.

Figure 3A:
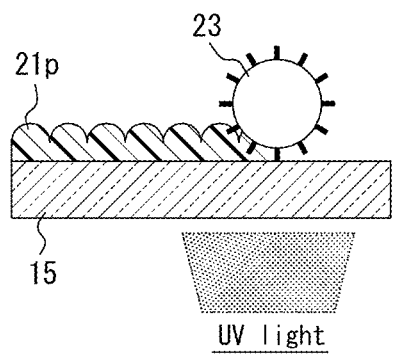
FIG. 3A illustrates an example of a method of producing the optical film illustrated in FIG. 2.

A substrate film 15 is prepared and then a UV curable resin layer 21p formed from an uncured UV curable resin (for example, UV curable acrylic resin) is formed on one surface of the substrate film 15 as illustrated in FIG. 3A. However, note that the resin used to form the curable resin layer 21p is not limited to a UV curable acrylic resin.

Note that the resin used to form the UV curable resin layer 21p is not limited to a UV curable acrylic resin.

The UV curable resin layer 21p is preferably formed from a curable resin for which the corresponding cured product is transparent. The curable resin may contain, for example, a polymerizable compound and a curing initiator. The polymerizable compound is a resin that is cured through the polymerization initiator. Examples of the polymerizable compound include for example an epoxy polymerizable compound and an acrylic polymerizable compound.

The epoxy polymerizable compound is a monomer, oligomer, or prepolymer that includes one epoxy group or two or more epoxy groups in a molecule thereof. Examples of the epoxy polymerizable compound include various bisphenol-type epoxy resins (for example, bisphenol A-type and bisphenol F-type), novolac-type epoxy resins, various modified epoxy resins such as rubber modified epoxy resins and urethane modified epoxy resins, naphthalene-type epoxy resins, biphenyl-type epoxy resins, phenol novolac-type epoxy resins, stilbene-type epoxy resins, triphenolmethane-type epoxy resins, dicyclopentadiene-type epoxy resins, triphenylmethane-type epoxy resins, and prepolymers thereof.

The acrylic polymerizable compound is a monomer, oligomer, or prepolymer that includes one acrylic group or two or more acrylic groups in a molecule thereof. Such monomers may be further categorized as monofunctional monomers including one acrylic group in a molecule thereof, difunctional monomers including two acrylic groups in a molecule thereof, and polyfunctional monomers including three or more acrylic groups in a molecule thereof.

Examples of "monofunctional monomers" include carboxylic acids (acrylic acid), hydroxy monomers (2-hydroxyethyl acrylate, 2-hydroxypropyl acrylate, 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate), and other functional monomers (2-methoxyethyl acrylate, methoxy ethylene glycol acrylate, 2-ethoxyethyl acrylate, tetrahydrofurfuryl acrylate, benzyl acrylate, ethyl carbitol acrylate, phenoxyethyl acrylate, N,N-dimethylaminoethyl acrylate, N,N-dimethylaminopropylacrylamide, N,N-dimethylacrylamide, acrylolylmorpholine, N-isopropylacrylamide, N,N-diethylacrylamide, N-vinylpyrrolidone, 2-(perfluorooctyl) ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of "difunctional monomers" include tri(propylene glycol) diacrylate, trimethylolpropane diallyl ether, and urethane acrylate.

Examples of "polyfunctional monomers" include trimethylolpropane triacrylate, dipentaerythritol penta- and hexaacrylate, and di(trimethylolpropane) tetraacrylate.

Examples of monomers other than the polymerizable acrylic compounds listed above include acrylic morpholine, glycerol acrylate, polyether acrylate, N-vinylformamide, N-vinylcaprolactone, ethoxydiethylene glycol acrylate, methoxytriethylene glycol acrylate, polyethylene glycol acrylate, EO-modified trimethylolpropane triacrylate, EO-modified bisphenol A diacrylate, aliphatic urethane oligomers, and polyester oligomers. The polymerizable compound is preferably an acrylic polymerizable compound from a viewpoint of transparency and ease of peeling with the fine structure body 16.

The curing initiator is a material that causes curing of the curable resin composition. Examples of the curing initiator include heat curing initiators and light curing initiators. The curing initiator may alternatively be a material that causes curing through any type of energy rays other than heat and light (for example, an electron beam). The curable resin is a thermosetting resin in a case in which the curing initiator is a heat curing initiators, and is a photocurable resin in a case in which the curing initiator is a light curing initiator.

The curing initiator is preferably a UV curing initiator from a viewpoint of transparency and ease of peeling with the fine structure body 16. Accordingly, the curable resin is preferably a UV curable acrylic resin. A UV curing initiator is one type of light curing initiator. Examples of the UV curing initiator include 2,2-dimethoxy-1,2-diphenylethan-1-one, 1-hydroxycyclohexyl phenyl ketone, and 2-hydroxy-2-methyl-1-phenylpropan-1-one.

Additives may be added to the UV curable resin layer 21p in accordance with the application of the optical film 14. Examples of such additives include inorganic fillers, organic fillers, leveling agents, surface modifiers, and defoamers. Examples of types of inorganic fillers that can be used include metal oxide microparticles of $SiO_2$, $TiO_2$, $ZrO_2$, $SnO_2$, $Al_2O_3$, or the like. Moreover, a release agent or the like may be added to the fine recess-protrusion layer 21 in order to facilitate peeling of the fine structure body 16 from the optical film 14.

The UV curable resin layer 21p is formed while bringing a roller 23 into close contact with the UV curable resin layer 21p as illustrated in FIG. 3A.

The roller 23 may, for example, have a hollow or solid cylindrical shape. A recess-protrusion pattern that corresponds to the recess-protrusion pattern in the fine recess-protrusion layer 21 is present at the surface of the roller 23. The roller 23 may alternatively have a flat-plate shape. Description of the method of production of the roller 23 having a configuration such as set forth above is omitted since it is well known by people in the relevant technical field and is not directly related to this disclosure.

Through close contacting of the roller 23 with the UV curable resin layer 21p formed from the uncured UV curable resin, the recess-protrusion pattern at the surface of the roller 23 is transferred to the surface of the UV curable resin layer 21p. Although the roller 23 may have a flat-plate shape as previously explained, a hollow or solid cylindrical shape enables the recess-protrusion pattern of the roller 23 to be transferred to the UV curable resin layer 21p by a roll-to-roll method, and thereby enables higher efficiency transfer.

In accompaniment to transfer of the recess-protrusion pattern of the roller 23 to the UV curable resin layer 21p, UV light is irradiated from the other surface side of the substrate film 15 as illustrated in FIG. 3A so as to cure the UV curable resin layer 21p. Through this operation, a fine recess-protrusion layer 21 can be formed on the substrate film 15. The surface of the roller 23 may be subjected to release treatment using a fluorine material or the like to facilitate peeling of the fine recess-protrusion layer 21 from the roller 23.

Figure 3B:
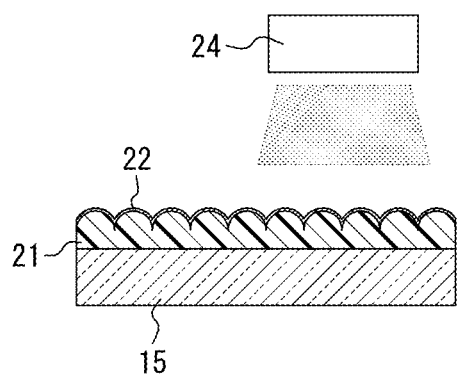
FIG. 3B illustrates an example of a method of producing the optical film illustrated in FIG. 2.

After formation of the fine recess-protrusion layer 21, an inorganic film 22 of approximately 5 nm to 50 nm, more preferably 15 nm to 35 nm, for example, in thickness is formed on the surface of the fine recess-protrusion layer 21 as a release layer by sputtering, as illustrated in FIG. 3B, using a sputtering target 24 made from tungsten oxide, for example. When the thickness of the inorganic film 22 is smaller than the above range, and when the thickness of the inorganic film 22 exceeds the above range, the separability of the fine structure body 16 from the inorganic film 22 is low. The material of the inorganic film 22 may alternatively be silicon oxide, silicon, ITO, or the like.

Figure 3C:
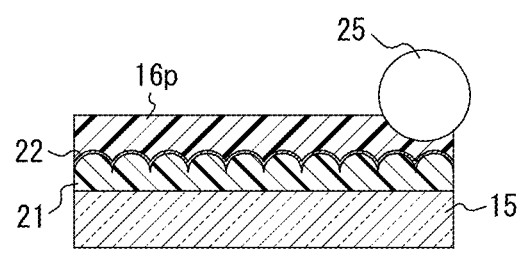
FIG. 3C illustrates an example of a method of producing the optical film illustrated in FIG. 2.

After formation of the inorganic film 22, a UV curable resin layer 16p formed from an uncured UV curable resin (for example, UV curable acrylic resin) is formed to a thickness of approximately 2 μm on the inorganic film 22 as illustrated in FIG. 3C. Since the UV curable resin layer 16p is formed from an uncured UV curable resin composition, the UV curable resin also enters into recesses of a recess-protrusion pattern of the inorganic film 22 such that a recess-protrusion structure is formed at the surface of the UV curable resin layer 16p at a side thereof corresponding to the inorganic film 22. In other words, a recess-protrusion pattern that is the reverse of the recess-protrusion pattern at the surface of the fine recess-protrusion layer 21 is formed at the surface of the UV curable resin layer 16p at the side thereof corresponding to the inorganic film 22.

Next, a roller 25 is brought into close contact with the UV curable resin layer 16p as illustrated in FIG. 3C. The roller 25 has a flat surface. This causes the surface of the UV curable resin layer 16p at the opposite side thereof relative to the inorganic film 22 to become a flat surface. By irradiating the UV curable resin layer 16p with UV light in accompaniment to close contacting of the roller 25 with the UV curable resin layer 16p, it is possible to cure the UV curable resin layer 16p and form a fine structure body 16 (thin-film optical body layer).

Figure 4:
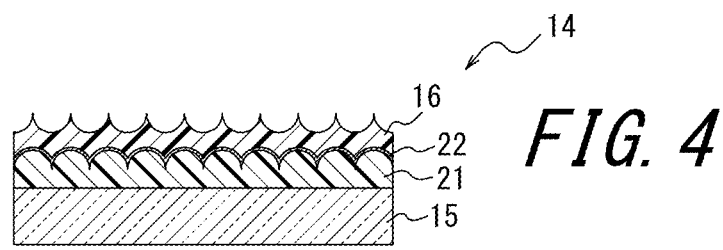
FIG. 4 illustrates another example of configuration of the optical film illustrated in FIGS. 1A to 1D.

Although the above describes an example in FIG. 2 and FIGS. 3A to 3C in which the surface of the fine structure body 16 at the opposite side thereof relative to the inorganic film 22 is a flat surface, the optical film 14 may also have a recess-protrusion pattern at the surface of the fine structure body 16 at the opposite side thereof relative to the inorganic film 22 as illustrated in FIG. 4. In other words, recess-protrusion patterns (fine structures) may be present at both surfaces of the fine structure body 16.

A method of producing the optical film 14 illustrated in FIG. 4 is described with reference to FIGS. 5A to 5C. Note that configurations that are the same as in FIGS. 3A to 3C are marked with the same reference signs in FIGS. 5A to 5C and description thereof is omitted.

Figure 5A:
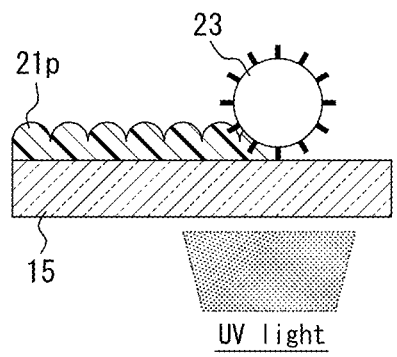
FIG. 5A illustrates an example of a method of producing the optical film illustrated in FIG. 4.
Figure 5B:
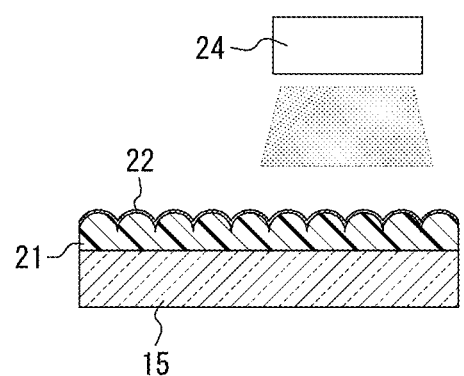
FIG. 5B illustrates an example of a method of producing the optical film illustrated in FIG. 4.

The steps illustrated in FIGS. 5A and 5B are the same as the steps illustrated in FIGS. 3A and 3B. In other words, in the step illustrated in FIG. 5A, a UV curable resin layer 21p is formed on one surface of a substrate film 15 and a roller 23 is brought into close contact with the UV curable resin layer 21p to form a recess-protrusion pattern at the surface of the UV curable resin layer 21p. The UV curable resin layer 21p is also irradiated with UV light to cure the UV curable resin layer 21p and form a fine recess-protrusion layer 21. In the step illustrated in FIG. 5B, an inorganic film 22 is formed on the fine recess-protrusion layer 21.

Figure 5C:
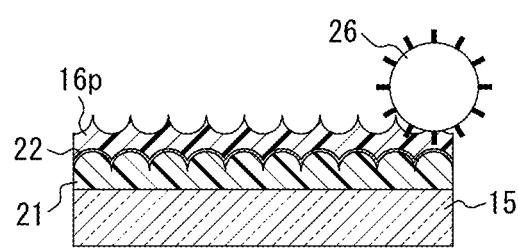
FIG. 5C illustrates an example of a method of producing the optical film illustrated in FIG. 4.

In the step illustrated in FIG. 5C, a UV curable resin layer 16p is formed on the inorganic film 22 in the same manner as in the step illustrated in FIG. 3C. Next, a roller 26 is brought into close contact with the UV curable resin layer 16p as illustrated in FIG. 5C. Here, a recess-protrusion pattern is formed on the surface of the roller 26. Therefore, a recess-protrusion is formed also on the surface of the UV curable resin layer 16p on the side opposite to the inorganic film 22. The roller 26 can use the same roller as the roller 23. By irradiating the UV curable resin layer 16p with UV light in accompaniment to close contacting of the roller 26 with the UV curable resin layer 16p, it is possible to cure the UV curable resin layer 16p and form a fine structure body 16 (thin-film optical body layer).

The following description once again refers to FIGS. 1A to 1C. In a pressing step illustrated in FIG. 1B that is performed after the application step illustrated in FIG. 1A, the light guide 13 is secured using a clamp jig 18, and the optical film 14 illustrated in FIG. 2 or FIG. 4 is pressed against the adhesive 12 applied onto the adherend 11 for a specific time by the light guide 13, via the clamp jig 18, from the surface at the opposite side to the surface at which the fine structure body 16 is located. The UV curable resin 12 spreads between the adherend 11 and the optical film 14 by being pressed by the optical film 14. The clamp jig 18 fixes the light guide 13 such that the light guide 13 does not block the transmitting light.

In the curing step illustrated in FIG. 1C, with the optical film 14 being pressed by the light guide 13 through the clamp jig 18, UV light is transmitted through the light guide 13 to cure the UV curable resin 12.

In a peeling separation step illustrated in FIG. 1D, the pressing of the optical film 14 is released and the optical film 14 is detached from the adherend 11 to thereby peel off the fine structure body 16 from the optical film 14 (at the interface between the fine structure body 16 and the inorganic film 22). In the curing step, only a region of the fine structure body 16 (thin optical body layer) formed in the optical film 14 which is provided with the UV curable resin 12 and is irradiated with light transmitted through the light guide 13 is fixed to the adherend 11 with the cured UV curable resin 12. When the optical film 14 is released, the fine structure body 16 fixed with the cured UV curable resin 12 is separated from the optical film 14 (substrate film 15) on the boundary between the fine structure body 16 and the inorganic film 22, in such a manner that the fine structure body 16 is isolated (parted) from the fine structure body 16 on the substrate film 15 other than the portion fixed with the UV curable resin 12 and remains as an antireflection optical body 16a on the adherend 11.

Figure 6:
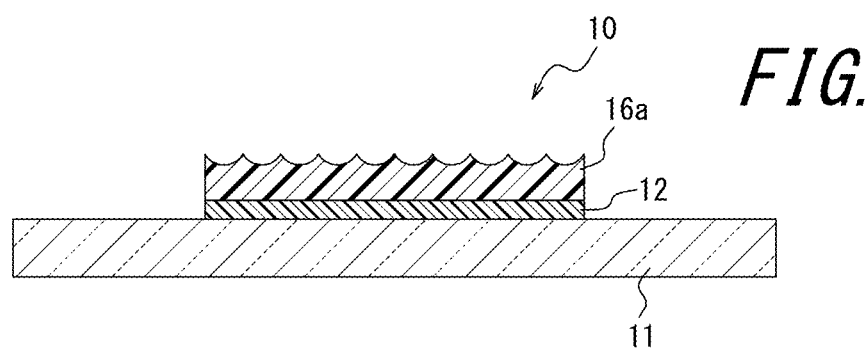
FIG. 6 illustrates an example of a state in which an antireflection optical body has been formed on an adherend by a formation method according to the first embodiment of this disclosure.
Figure 7:
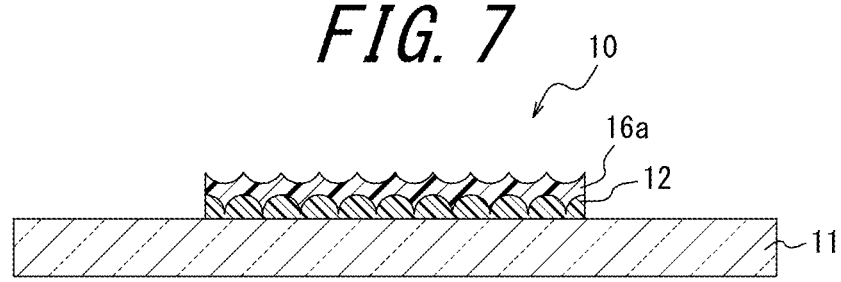
FIG. 7 illustrates another example of a state in which an antireflection optical body has been formed on an adherend by a formation method according to the first embodiment of this disclosure.

FIGS. 6 and 7 illustrate examples of a state in which an antireflection optical body 16a has been formed on an adherend 11 by the formation method according to the present embodiment. FIG. 6 illustrates an example in which the optical film 14 illustrated in FIG. 2 (optical film 14 in which the surface of the fine structure body 16 at the opposite side thereof relative to the inorganic film 22 is flat) is used. FIG. 7 illustrates an example in which the optical film 14 illustrated in FIG. 4 (optical film 14 in which recess-protrusion patterns are present at both surfaces of the fine structure body 16) is used.

As illustrated in FIGS. 6 and 7, according to this embodiment, a component 10 can be formed in which the antireflection optical body 16a is formed on only a part of the adherend 11 with the cured UV curable resin 12 therebetween. The component 10 may be used, for example, for a display panel or the like. When the component 10 is used as a display panel of an electronic device such as a mobile phone or a smartphone, the antireflection optical body 16a is formed for example in a region (for example, a region of approximately several mm×several mm) in the neighborhood of lenses of an imaging device provided on the electronic device on the display surface side of the entire display panel.

Note that in a case in which an optical film 14 that has recess-protrusion patterns at both surfaces of the fine structure body 16 is used, the UV curable resin 12 enters into and is cured in recesses in the surface of the fine structure body 16 at a side corresponding to the adherend 11 as illustrated in FIG. 7. This enables improvement of adhesive force between the fine structure body 16 and the adherend 11.

Thus, in this embodiment, the UV curable resin 12 is irradiated with UV light through the light guide 13; accordingly, only a region of the fine structure body 16 formed in the optical film 14, which is provided with the UV curable resin 12 and is irradiated with light transmitted through the light guide 13 is fixed to the adherend 11 by curing of the UV curable resin 12. The fine structure body 16 fixed to the adherend 11 is then separated from the optical film 14, thereby forming the antireflection optical body 16a on the adherend 11. Therefore, the antireflection optical body 16a can easily be formed only on a part of the adherend 11 by only adjusting the shape of the region to be coated with the UV curable resin 12 and the shape of the light guide 13.

Second Embodiment

Next, a method of forming the antireflection optical body 16a according to a second embodiment of this disclosure will be described.

FIGS. 8A to 8D illustrate a method of forming an antireflection optical body according to an embodiment of this disclosure. The method of forming an antireflection optical body according to the present embodiment includes a pressing step, a curing step, and a peeling separation step.

Figure 9:
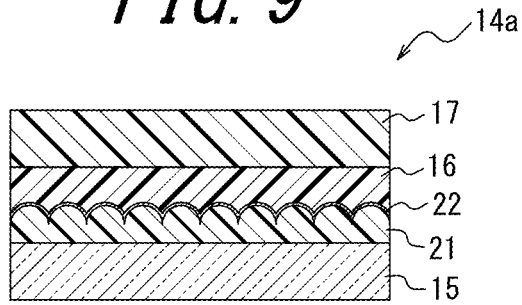
FIG. 9 illustrates an example of configuration of an optical film illustrated in FIGS. 8A to 8D.

In the first embodiment, the adherend 11 is coated with the UV curable resin 12, the optical film 14 is then attached under pressure to the adherend 11, followed by curing of the UV curable resin 12, thereby forming the antireflection optical body 16a only on a part of the adherend 11. On the other hand, in this embodiment, as illustrated in FIG. 9, an optical film 14a is used in which an adhesive layer 17 (a photocurable resin layer) made of a photocurable resin (UV curable resin) in a semi-cured state is formed on the fine structure body 16. Note that in the optical film 14a, the surface of the fine structure body 16 on the side opposite to the inorganic film 22 is a flat surface.

A method of producing the optical film 14a illustrated in FIG. 9 is described with reference to FIGS. 10A to 10C.

Figure 10A:
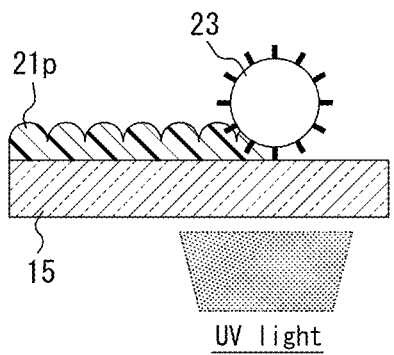
FIG. 10A illustrates an example of a method of producing the optical film illustrated in FIG. 9.
Figure 10B:
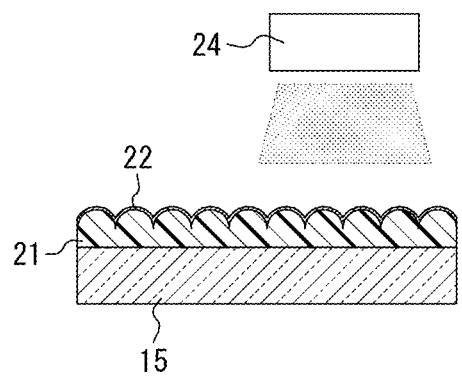
FIG. 10B illustrates an example of a method of producing the optical film illustrated in FIG. 9.
Figure 10C:
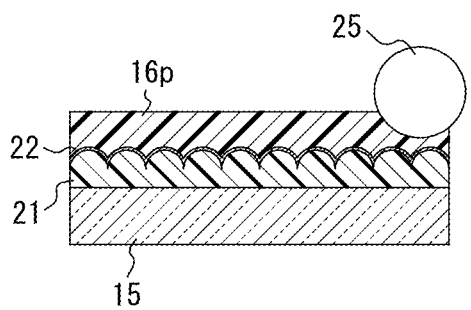
FIG. 10C illustrates an example of a method of producing the optical film illustrated in FIG. 9.

The steps illustrated in FIG. 10A to FIG. 10C are similar to the steps illustrated in FIG. 3A to FIG. 3C. Specifically, in the step illustrated in FIG. 10A, a UV curable resin layer 21p is formed on one surface side of a substrate film 15, and a recess-protrusion pattern is formed on a surface of the UV curable resin layer 21p by bringing the roller 23 into a contact with the UV curable resin layer 21p. The UV curable resin layer 21p is irradiated with UV light to cure the UV curable resin layer 21p, thereby forming the fine recess-protrusion layer 21. Further, in the step illustrated in FIG. 10B, the inorganic film 22 is formed on the fine recess-protrusion layer 21. Further, in the step illustrated in FIG. 10C, a UV curable resin layer 16p in an uncured state is formed on the inorganic film 22, and the roller 25 is brought into a contact with the UV curable resin layer 16p. While the roller 25 is brought into a contact with the UV curable resin layer 16p, the UV curable resin layer 16p is irradiated with UV light to cure the UV curable resin layer 16p, thereby forming the fine structure body 16. Note that recess-protrusion patterns (fine structures) may be formed on both sides of the fine structure body 16 (thin optical body layer) as illustrated in FIG. 4.

Figure 10D:
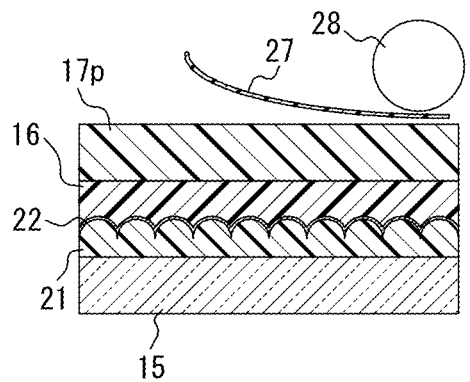
FIG. 10D illustrates an example of a method of producing the optical film illustrated in FIG. 9.

In the step illustrated in FIG. 10D, potting is performed by supplying a UV curable resin onto the fine structure body 16, and the fine structure body 16 is pressed by a roller 28 with a release film 27 therebetween, thereby forming a UV curable resin layer 17p. The UV curable resin layer 17p is then irradiated with UV light to semi-cure the UV curable resin layer 17p, thereby forming the adhesive layer 17.

Note that when the UV curable resin layer 17p was irradiated with UV light at a dose of 2 kJ/m$^2$, the UV curable resin layer 17p was not cured and remained as liquid. When the UV curable resin layer 17p was irradiated with UV light at a dose of 4 kJ/m$^2$, the UV curable resin layer 17p was completely cured. On the other hand, when the UV curable resin layer 17p was irradiated with UV light at a dose of 3 kJ/m$^2$, the UV curable resin layer 17p was semi-cured and the fine structure body 16 was successfully fixed to the adherend 11.

Referring back to FIGS. 8A to 8D, the optical film 14a is held by the light guide 13. Here, the optical film 14a is held such that the side where the fine structure body 16 and the adhesive layer 17 are formed faces the adherend 11. Note that in FIG. 8A to FIG. 8D, the fine recess-protrusion layer 21 and the inorganic film 22 are not shown for brevity.

Figure 8A:
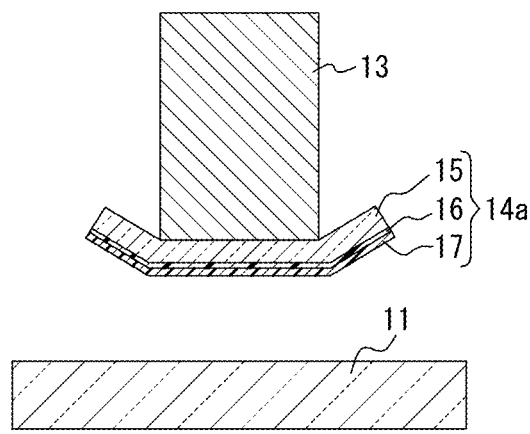
FIG. 8A is a diagram illustrating a method of forming an antireflection optical body of a second embodiment of this disclosure.
Figure 8B:
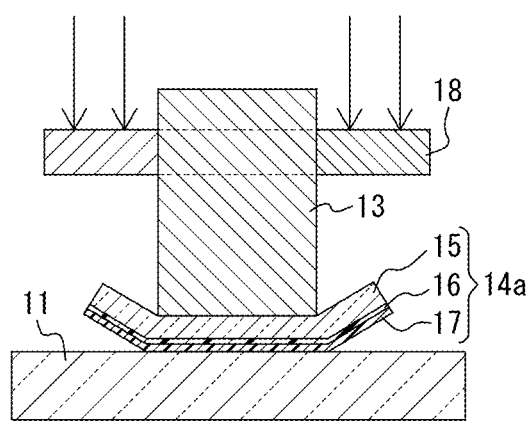
FIG. 8B illustrates a pressing step in a method of forming an antireflection optical body according to the second embodiment of this disclosure.

In the pressing step illustrated in FIG. 8B, the light guide 13 is fixed using the clamp jig 18 and the optical film 14a is pressed by the light guide 13 against the adherend 11 through the clamp jig 18 from the side opposite to the side where the fine structure body 16 and the adhesive layer 17 are formed.

Figure 8C:
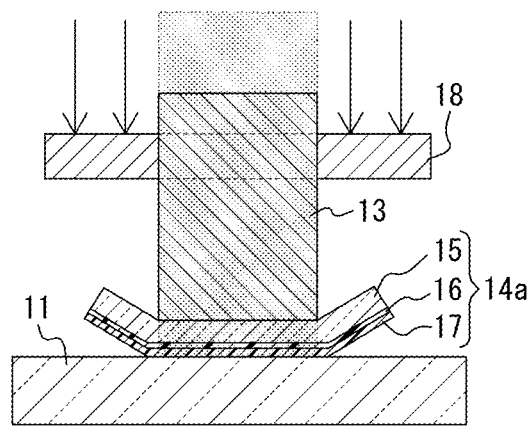
FIG. 8C illustrates a curing step in a method of forming an antireflection optical body according to the second embodiment of this disclosure.

In the curing step illustrated in FIG. 8C, with the optical film 14 being pressed by the light guide 13 through the clamp jig 18, UV light is transmitted through the light guide 13 to cure the UV curable resin 17.

Figure 8D:
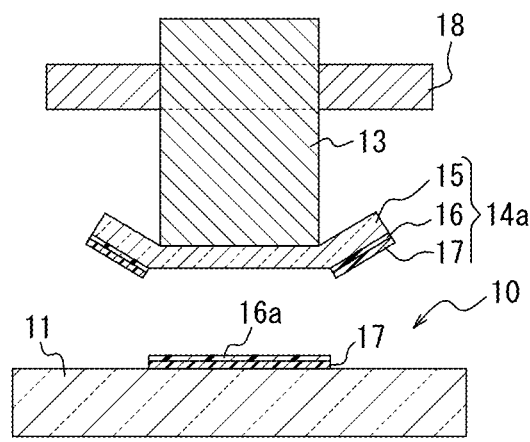
FIG. 8D illustrates a peeling separation step in a method of forming an antireflection optical body according to the second embodiment of this disclosure.

In the peeling separation step illustrated in FIG. 8D, the pressure on the optical film 14a is released to release the optical film 14a from the adherend 11, thereby separating the fine structure body 16 from the optical film 14a. In the curing step, a region of the fine structure body 16 formed in the optical film 14a, which is irradiated with the light transmitted through the light guide 13 is fixed to the adherend 11 with the cured adhesive layer 17. When the optical film 14a is released, the fine structure body 16 fixed with the cured adhesive layer 17 is separated from the optical film 14a (substrate film 15) on the boundary between the fine structure body 16 and the inorganic film 22, in such a manner that the fine structure body 16 is isolated (parted) from the fine structure body 16 on the substrate film 15 other than the portion fixed with the adhesive layer 17 and remains as an antireflection optical body 16a on the adherend 11.

Figure 11:
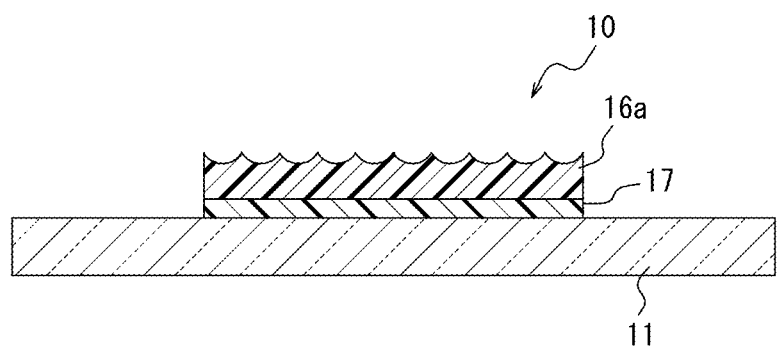
FIG. 11 illustrates an example of a state in which an antireflection optical body has been formed on an adherend by a formation method according to the second embodiment of this disclosure.

FIG. 11 illustrates an example of a state of the adherend 11 being formed on the antireflection optical body 16a according to the formation method of this embodiment;

As illustrated in FIG. 11, according to this embodiment, the component 10 can be formed in which the antireflection optical body 16a is formed on only a part of the adherend 11 with the cured adhesive layer 17 therebetween.

Thus, in this embodiment, the adhesive layer 17 is irradiated with UV light through the light guide 13; accordingly, only a region of the fine structure body 16 formed in the optical film 14a, which is irradiated with light transmitted through the light guide 13 is fixed to the adherend 11 by curing of the adhesive layer 17. The fine structure body 16 fixed to the adherend 11 is then separated from the optical film 14a, thereby forming the antireflection optical body 16a on the adherend 11. Therefore, the antireflection optical body 16a can easily be formed only on a part of the adherend 11 by adjusting the shape of the attached surface of the light guide 13.

The following provides a more specific description of this disclosure through examples and comparative examples. However, this disclosure is not limited by the following examples.

In the following examples, a white glass sheet "S9112" manufactured by Matsunami Glass Ind., Ltd. was used as the adherend 11. As the light guide 13, a quartz member having dimensions of 10 mm×10 mm×20 mm (the size of the surface in contact with the optical films 14, 14a was 10 mm×10 mm) was used. The surface of the light guide 13 in contact with the optical films 14, 14a was a flat surface.

Example 1

An optical film 14 having the configuration illustrated in FIG. 2 was used in the present example. First, production conditions for the optical film 14 are described.

A PET film of 125 μm in thickness produced by Teijin Limited was used as a substrate film 15. A UV curable resin layer 21p formed from a UV curable resin was formed on the substrate film 15. A roller 23 was brought into close contact with the UV curable resin layer 21p and irradiation with UV light was performed to cure the curable resin layer 21p and form a fine recess-protrusion layer 21. A recess-protrusion pattern having a recess-protrusion pitch of 150 nm to 230 nm and a recess depth of approximately 250 nm was formed in the fine recess-protrusion layer 21. An inorganic film 22 of 20 nm in thickness was formed as a release layer on the surface of the fine recess-protrusion layer 21 by sputtering using a sputtering target made from tungsten oxide. The thickness of the inorganic film 22 is preferably 5 nm to 50 nm, and more preferably 15 nm to 35 nm. When the thickness of the inorganic film 22 is smaller than the above range, and when the thickness of the inorganic film 22 exceeds the above range, the separability of the fine structure body 16 from the inorganic film 22 is low. Accordingly, in this example, the thickness of the inorganic film 22 was set to be 20 nm.

A UV curable resin layer 16p of approximately 2 μm in thickness that was formed from an uncured UV curable acrylic resin was formed on the inorganic film 22. A roller 25 was brought into close contact with the UV curable resin layer 16p, and the UV curable resin layer 16p was irradiated with UV light with a dose of 10 kJ/m² to cure the UV curable resin layer 16p and form a fine structure body 16. A recess-protrusion pattern that corresponded to the recess-protrusion pattern formed in the fine recess-protrusion layer 21 and that had a recess-protrusion pitch of 150 nm to 230 nm and a recess depth of approximately 250 nm was formed at the surface of the fine structure body 16 at a side thereof corresponding to the inorganic film 22. The thickness of the fine structure body 16 is desirably 10 μm or less as described above. When the thickness of the fine structure body 16 exceeds 10 μm, the fine structure body 16 fixed to the adherend 11 can hardly be separated from the portion of the fine structure body 16 on the substrate film 15 other than the fixed portion as described in more detail below. Accordingly, in this example, the thickness of the fine structure body 16 was set to be approximately 2 μm.

Further, as illustrated in FIG. 1A, 0.3 μL of the UV curable resin 12 ("TB3042" manufactured by ThreeBond Co., Ltd.) was applied dropwise onto one surface of the adherend 11 using a micro pipet.

Next, as illustrated in FIG. 1B, the optical film 14 was pressed with a pressure of approximately 0.5 MPa against the UV curable resin 12 applied to the adherend 11 by the light guide 13 through the clamp jig 18 from the side opposite to the side where the fine structure body 16 was formed.

Next, as illustrated in FIG. 1C, with the optical film 14 being pressed by the light guide 13 through the clamp jig 18, UV light was transmitted through the light guide 13 to cure the UV curable resin 12. In this example, a halogen lamp was used for the irradiation with the UV light through the light guide 13 at a dose of 15 kJ/m².

Next, the pressing of the optical film 14 was released and the optical film 14 was detached from the adherend 11 to perform peeling separation of the fine structure body 16 fixed to the adherend 11 through the UV curable resin 12 as illustrated in FIG. 1D.

Note that when the adhesion between the adherend 11 and the fine structure body 16 with the UV curable resin 12 is stronger than the adhesion between the fine structure body 16 and the fine recess-protrusion layer 21, the fine structure body 16 can be separated from the optical film 14 and fixed as the antireflection optical body 16a to the adherend 11. Further, since the fine structure body 16 was as thin as approximately 2 μm, it could easily be isolated from the portion of the fine structure body 16 other than the fixed portion. Since the inorganic film 22 was formed as a release layer between the fine structure body 16 and the fine recess-protrusion layer 21, the fine structure body 16 could easily be separated from the optical film 14.

Example 2

An optical film 14 having recess-protrusion patterns at both surfaces of a fine structure body 16 as illustrated in FIG. 4 was used in the present example. The method of producing the optical film 14 used in this example is substantially the same as in Example 1. However, in this example, after the UV curable resin layer 16p was formed on the inorganic film 22, the roller 26 having a recess-protrusion on its surface was brought into a contact with the UV curable resin layer 16p instead of the roller 25 having a smooth surface, and the UV curable resin layer 16p was then cured. The recess-protrusion pattern formed on the surface of the fine structure body 16 on the side opposite to the inorganic film 22 was similar to the recess-protrusion pattern formed on the inorganic film 22 side; the recess-protrusion pitch was 150 nm to 230 nm and the depth of the recesses was approximately 250 nm. Further, also in this example, the thickness of the fine structure body 16 was set to be approximately 2 μm. When the thickness of the fine structure body 16 exceeds 10 μm, the fine structure body 16 fixed to the adherend 11 can hardly be separated from the portion of the fine structure body 16 on the substrate film 15 other than the fixed portion as described above.

In this example, using the thus fabricated optical film 14 (recess-protrusion patterns were formed on both sides of the fine structure body 16 in the optical film 14), the antireflection optical body 16a was formed on the adherend 11 by the formation method illustrated in FIG. 1A to FIG. 1D under the same conditions as in Example 1.

Example 3

In this example, the optical film 14 (recess-protrusion patterns were formed on both sides of the fine structure body 16 in the optical film 14) fabricated under the same conditions as in Example 2 was used. This optical film 14 was used to form the antireflection optical body 16a on the adherend 11 by the formation method illustrated in FIG. 1A to FIG. 1D. Note that in this example, in the steps illustrated in FIGS. 1B and 1C, the pressure applied by the light guide 13 to the adherend 11 through the optical film 14 was higher than that in Example 2. Specifically, the pressure applied by the light guide 13 to the adherend 11 through the optical film 14 was 0.5 MPa in Example 2; on the other hand, the pressure applied by the light guide 13 to the adherend 11 through the optical film 14 was changed to 3.0 MPa in this Example. The other conditions were the same as those in Example 2.

Example 4

In this example, the optical film 14a depicted in FIG. 9 was used in which the adhesive layer 17 was formed on the fine structure body 16. First, the conditions for producing the optical film 14a will be described.

The steps up to the formation of the fine structure body 16 were similar to those in Example 1 and are not be described again. After the formation of the fine structure body 16, potting was performed by supplying a UV curable resin onto the fine structure body 16, and the fine structure body 16 was pressed by the roller 28 with the release film 27 therebetween, thereby forming the UV curable resin layer 17p. The UV curable resin layer 17p was then irradiated with UV light at a dose of 3 kJ/m$^2$ to semi-cure the UV curable resin, thereby forming the adhesive layer 17 to a thickness of approximately 3 μm.

The thus fabricated optical film 14a (the adhesive layer 17 was formed on the fine structure body 16 in the optical film) was used to form the antireflection optical body 16a on the adherend 11 by the formation method illustrated in FIG. 8A to FIG. 8D.

Specifically, as illustrated in FIG. 8A, the optical film 14a was held by the light guide 13 through the clamp jig 18 from the side opposite to the side where the fine structure body 16 and the adhesive layer 17 were formed. As illustrated in FIG. 8B, the adherend 11 was pressed with a pressure of approximately 0.5 MPa.

Next, as illustrated in FIG. 8C, with the optical film 14a being pressed by the light guide 13 through the clamp jig 18, UV light was transmitted through the light guide 13 to cure the adhesive layer 17. In this example, a halogen lamp was used for the irradiation with the UV light through the light guide 13 at a dose of 15 kJ/m$^2$.

Next, as illustrated in FIG. 8D, the pressure on the optical film 14a was released to release the optical film 14a from the adherend 11, thereby separating the fine structure body 16 from the optical film 14a.

Note that when the adhesion between the adherend 11 and the fine structure body 16 with the adhesive layer 17 is stronger than the adhesion between the fine structure body 16 and the fine recess-protrusion layer 21, the fine structure body 16 can be separated from the optical film 14a and fixed as the antireflection optical body 16a to the adherend 11. Since the inorganic film 22 was formed as a release layer between the fine structure body 16 and the fine recess-protrusion layer 21, the fine structure body 16 could easily be separated from the optical film 14a.

Comparative Example 1

Next, a method of forming an antireflection optical body on an adherend according to Comparative Example 1 will be described.

As a substrate film, a cyclic olefin-based film (COC film) having a thickness of 50 μm was used. A UV curable resin was applied onto one surface of the COC film, and a recess-protrusion pattern was formed on the UV curable resin by roll to roll processing using a roller on which surface a recess-protrusion pattern was formed. The UV curable resin was then cured, so that an optical film having a fine structure body on one side was formed. The recess-protrusion pattern of the fine structure body had a recess-protrusion pitch of 150 nm to 230 nm and the depth of the recesses was approximately 250 nm as in Examples 1 to 4. An adhesive member (adhesive tape which was a 25 μm thick acrylic resin-based adhesive member ("PDS1" manufactured by PANAC Co., Ltd.)) was used to bond the surface of the optical film opposite to the side where the fine structure body was formed to the adherend with the use of a roller, thereby forming the antireflection optical body on the adherend.

Comparative Example 2

Next, a method of forming an antireflection optical body on an adherend according to Comparative Example 2 will be described.

First, as a substrate film, a PET film manufactured by TEIJIN LIMITED with a thickness of 125 μm was used. A UV curable resin was applied onto one surface of the PET film, and a recess-protrusion pattern was formed on the UV curable resin by roll to roll processing using a roller on which surface a recess-protrusion pattern was formed. The UV curable resin was then cured, and the cured UV curable resin was coated with a tungsten oxide film having a thickness of 20 nm by sputtering. After that, the coating was performed with a fluorine resin using a release material ("Novec™ 1720" manufactured by 3M Company); thus, the optical film having a fine structure body on one surface side was formed.

After a UV curable resin was applied onto the adherend, the surface of the optical film opposite to the side where the fine structure body was formed was attached under pressure to the adherend using a roller. Subsequently, the pressure applied by the roller was released, and the UV curable resin was cured by being irradiated with UV light, thereby forming an antireflection optical body on the adherend.

Evaluation results for the antireflection optical body formed on the adherend 11 according to each of Examples 1 to 4 and Comparative Examples 1 and 2 above will be described.

First, the evaluation results for the thickness of the antireflection optical body formed on the adherend 11 according to each of Examples 1 to 4 and Comparative Examples 1 and 2 are given in Table 1.

The thickness was measured by measuring total nine thicknesses: the thicknesses of two portions at ends of the antireflection optical body and one portion at the center each in the X direction, in the Y direction orthogonal to the X direction, and along the surface where the antireflection optical body was formed, using a thickness gauge (LITEMATIC VL-50S manufactured by Mitutoyo Corporation). The average thickness (average formed body thickness), the standard deviation of the thicknesses (the standard deviation in the thickness of the formed body), and the difference between the maximum thickness and the minimum thickness (the formed body thickness Max–Min) were then calculated from the measured thicknesses of the nine portions.

TABLE 1

| Unit: μm | Example 1 | Example 2 | Example 3 | Exampel 4 | Comparative Example 1 | Comparative Example 2 |
|---|---|---|---|---|---|---|
| Average formed body thickness | 5.2 | 4.5 | 1.7 | 5.7 | 74.1 | 12.4 |
| Standard deviation of formed body thickness | 0.5 | 0.4 | 0.6 | 1.8 | 0.7 | 3.9 |
| Formed body thickness Max-Min | 1.6 | 1.3 | 1.7 | 5.8 | 2.2 | 12.1 |

As given in Table 1, in Comparative Example 1, the standard deviation of the formed body thickness was substantially the same as that in Examples 1 to 3, but was larger than that in Examples 1 to 4. As described above, considering uses for electronic devices, the thickness of the antireflection optical body is required to be as small as 10 μm or less. Accordingly, the thickness was excessively large in Comparative Example 1, which was unsuitable for the above uses.

Further, in Comparative Example 2, the thickness was substantially as small as that in Examples 1 to 4; however, the thickness varied greatly, and the surface would be distorted.

On the other hand, in Examples 1 to 4, the thickness was 10 μm or less, which was sufficiently thin. In addition, in Examples 1 to 3, the thickness less varied, and lower distortion was achieved. Comparison of Example 2 and Example 3 indicates a significant difference in the thickness of the formed antireflection optical body. In Example 2 and Example 3, the pressure applied to the adherend 11 by the optical film 14 was different. This indicates that the thickness of the antireflection optical body can be adjusted by controlling the pressure applied to the adherend 11 by the optical film 14.

Figure 12A:
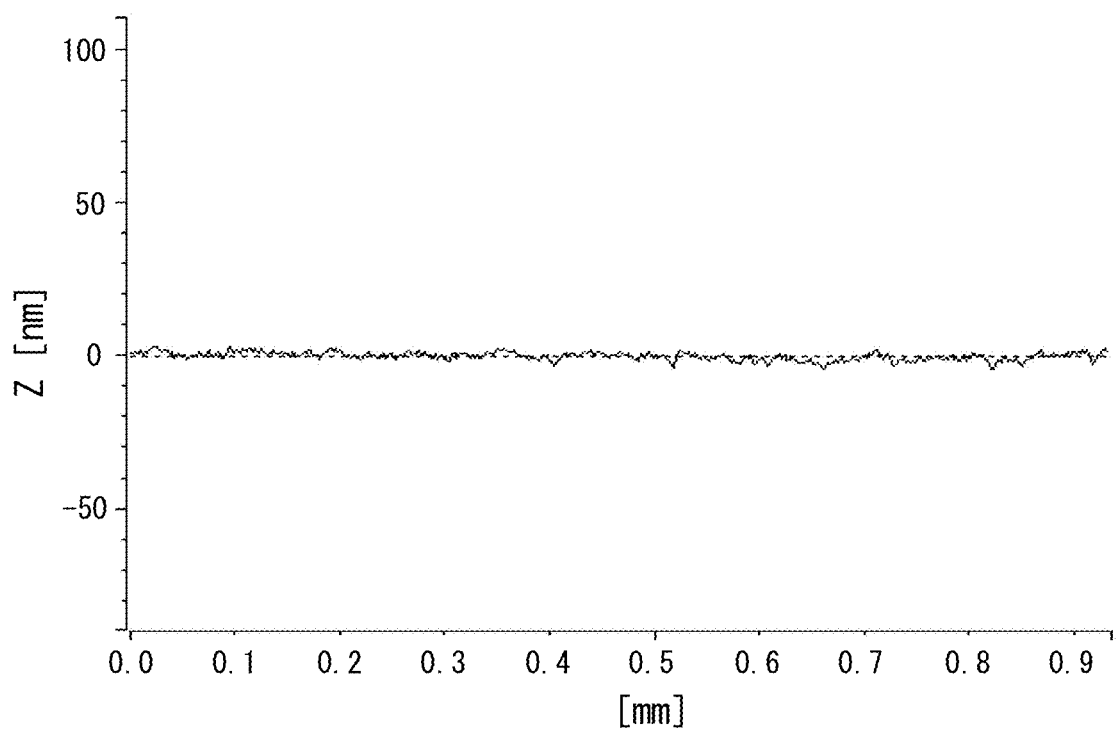
FIG. 12A is a graph displaying the results of measurements of a surface property of an antireflection optical body according to Example 1.
Figure 12B:
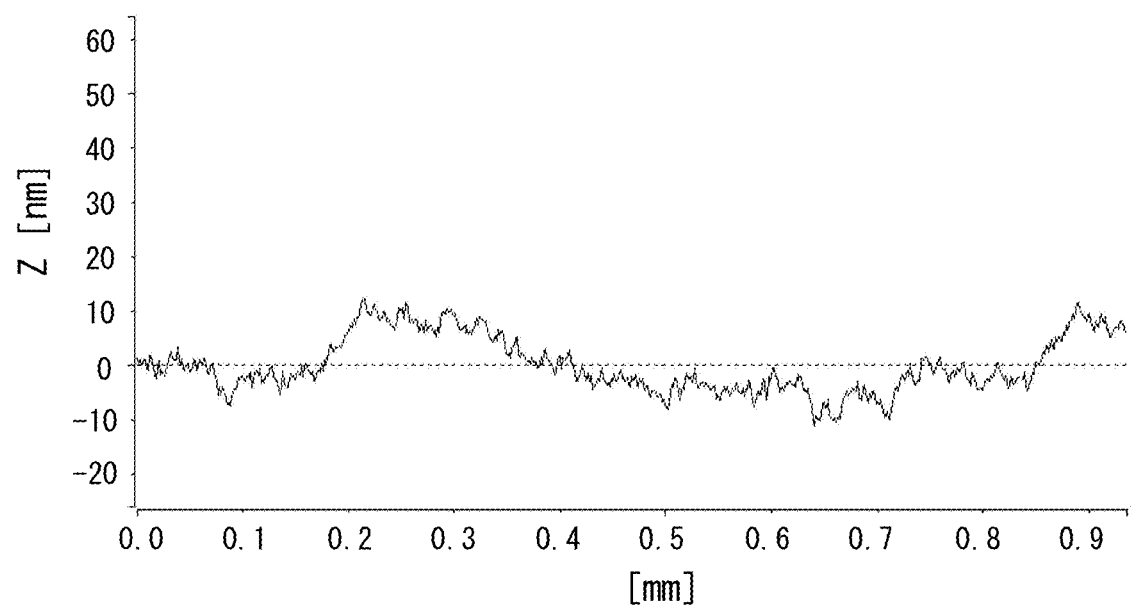
FIG. 12B is a graph displaying the results of measurements of a surface property of an antireflection optical body according to Comparative Example 1.

A surface property of the formed antireflection optical body was measured, and the results are given in FIGS. 12A and 12B. As exemplary examples, FIG. 12A illustrates the measurement result of the surface property of the antireflection optical body formed in Example 1, and FIG. 12B illustrates the measurement result of the surface property of the antireflection optical body formed in Comparative Example 1. Note that FIGS. 12A and 12B represent the results of measurements using a 3D surface profiler ("VertScan" developed by Ryoka Systems Inc.). In FIGS. 12A and 12B, the horizontal axis represents the distance on the formed antireflection optical body in one direction, and the vertical axis represents the difference between a reference thickness at a specific position and the thickness at each portion.

As illustrated in FIGS. 12A and 12B, the antireflection optical body formed in Example 1 has less variation in the thickness and less surface distortion compared with the antireflection optical body formed in Comparative Example 1.

FIG. 13A to FIG. 13F are images of the antireflection optical body formed on the adherend 11 in Examples 1 to 4 and Comparative Examples 1 and 2, respectively, taken from above. Referring to FIG. 13A to FIG. 13F, a fine structure body was formed in which the rectangular (oblong) region was a target area. Note that when the image was taken, black tape was attached to the back of the adherend (the surface opposite to the side where the fine structure body was formed) to facilitate observation.

As illustrated in FIG. 13A to FIG. 13D, in Examples 1 to 4, the fine structure body was formed to correspond to the rectangular region that was the target area, and the fine structure body was formed precisely only on a part of the adherend.

Figure 13A:
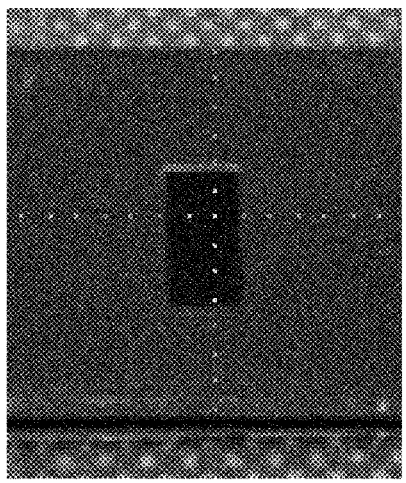
FIG. 13A is an image of an antireflection optical body according to Example 1, taken from above.
Figure 13B:
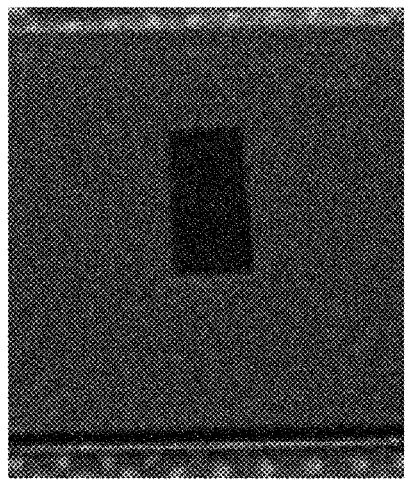
FIG. 13B is an image of an antireflection optical body according to Example 2, taken from above.
Figure 13C:
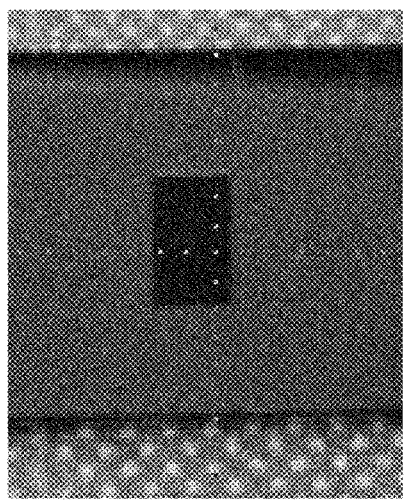
FIG. 13C is an image of an antireflection optical body according to Example 3, taken from above.
Figure 13D:
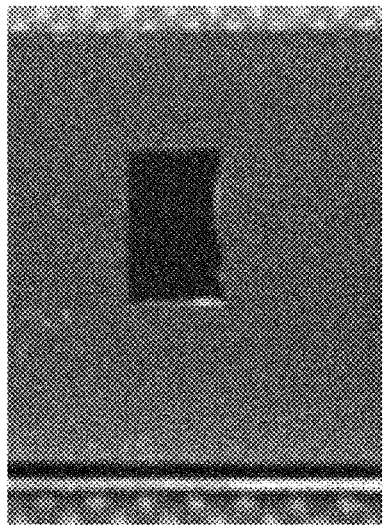
FIG. 13D is an image of an antireflection optical body according to Example 4, taken from above.
Figure 13E:
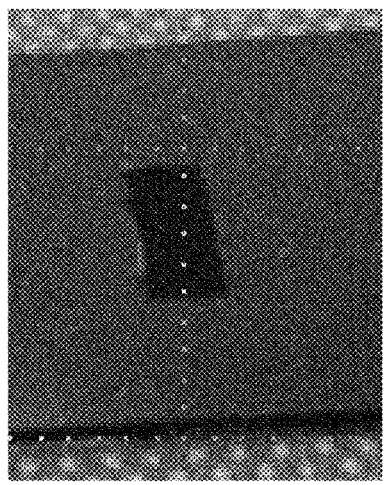
FIG. 13E is an image of an antireflection optical body according to Comparative Example 1, taken from above.

Also in Comparative Example 1, as illustrated in FIG. 13E, the fine structure body was formed to substantially correspond to the rectangular region that was the target area. However, in Comparative Example 1, since the adhesive tape and the optical film were placed in accordance with the target area and were bonded using the roller, the bonding would be difficult if the target area was small. Further, as described above, in Comparative Example 1, since the thickness of the fine structure body was large, the method according to Comparative Example 1 could hardly be applied to the formation of the antireflection optical body to be used for an electronic device.

Figure 13F:
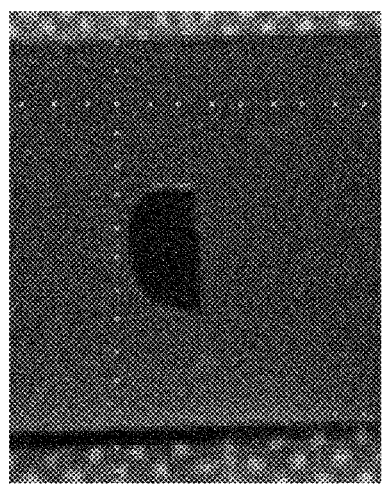
FIG. 13F is an image of an antireflection optical body according to Comparative Example 2, taken from above.

Further, in Comparative Example 2, as illustrated in FIG. 13F, the fine structure body could not be formed to correspond to the rectangular region that was the target area. Accordingly, it is difficult to form the antireflection optical body precisely only on the desired region using the method according to Comparative Example 2.

Next, the evaluation results of the antireflection property of the fine structure body on the adherend 11 in Examples 1 to 4 will be described.

Figure 14:
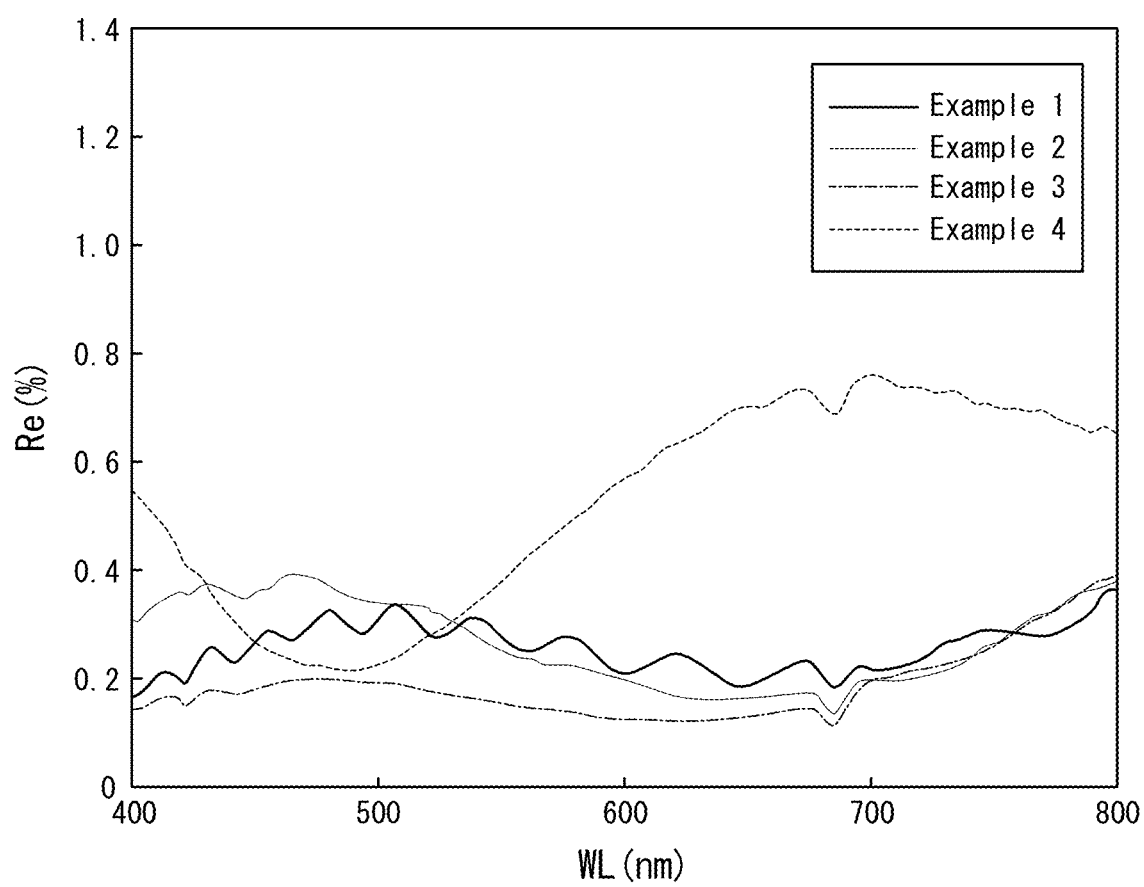
FIG. 14 is a diagram representing the reflection spectra from antireflection optical bodies according to Example 1 to Example 4.

The luminous reflectance of the antireflection optical body formed in Examples 1 to 4 (the reflectance of the Y value in the XYZ color space, which is a reflectance measured according to JIS Z 8722) is given in Table 2. Note that when the antireflection optical body is used as an antireflection member, the luminous reflectance is typically 1% or less, preferably 0.6% or less. Further, FIG. 14 illustrates the reflection spectrum of the antireflection optical body formed in Examples 1 to 4. In FIG. 14, the horizontal axis represents the wavelength of the incident light, and the vertical axis represents the reflectance of the incident light.

TABLE 2

|  | Luminous reflectance |
| --- | --- |
| Example 1 | 0.27 |
| Example 2 | 0.26 |
| Example 3 | 0.15 |
| Example 4 | 0.42 |

As given in Table 2, the luminous reflectance was 0.6% or less in any of Examples 1 to 4. Further, as given in FIG. 14, the reflectance with respect to the wavelengths was 0.8% or less in any of Examples 1 to 4, which means that a good reflection property was achieved.

As given in FIG. 14, the reflection spectrum of Example 1 contains ripples throughout the wavelength range. On the other hand such ripples were not observed in Example 2 in which the antireflection optical body was formed under the same conditions except for the structure of the optical film 14 (fine structure body 16). Therefore, the ripples observed in Example 1 are considered to be attributed to the structure of the fine structure body 16.

In Example 1, the interface between the adherend 11 and the UV curable resin 12 and the interface between the UV curable resin 12 and the fine structure body 16 were substantially flat. Therefore, the ripples observed in the reflection spectrum of Example 1 are considered to be attributed to the difference between the refractive index of light at the interface between the adherend 11 and the UV curable resin 12 and the refractive index of light at the interface between the UV curable resin 12 and the fine structure body 16. In other words, the ripples in the reflection spectrum are considered to have been formed by interference between the light reflected by the interface between the adherend 11 and the UV curable resin 12 and the light reflected by the interface between the UV curable resin 12 and the fine structure body 16.

On the other hand, in Example 2, the interface between the adherend 11 and the UV curable resin 12 was flat, but the interface between the UV curable resin 12 and the fine structure body 16 had a recess-protrusion structure. Therefore, the lights reflected by the two interfaces did not interfere, which is considered to have avoided the formation of the ripples. Thus, when recess-protrusion patterns are formed on both sides of the fine structure body 16 as in Examples 2 and 3, ripples can be prevented from being formed in the reflection spectrum, and a better reflection property can be achieved.

Thus, a method of forming the antireflection optical body 16a on the adherend 11, according to the first embodiment of this disclosure, includes: an application step of applying the UV curable resin 12 (photocurable resin) onto a surface of the adherend 11; a pressing step of pressing the substrate film 15 on one surface side of which the fine structure body 16 is formed as a thin film, against the UV curable resin 12 from an opposite surface side to the one surface side using the light guide 13 transparent to light; a curing step of curing the UV curable resin 12 by transmitting UV light through the light guide 13 with the substrate film 15 being pressed by the light guide 13; and a peeling separation step of releasing the pressing of the substrate film 15 and peeling fixed fine structure body 16 that is fixed to the adherend 11 through the cured UV curable resin 12 from the substrate film 15 while separating the fixed fine structure body 16 from fine structure body 16 on the substrate film 15 other than at a location fixed through the UV curable resin 12 such that the fixed fine structure body 16 is formed on the adherend 11 as an antireflection optical body.

Further, a method of forming the antireflection optical body 16a on the adherend 11, according to the second embodiment of this disclosure, includes: a pressing step of pressing the substrate film 15 in which the fine structure body 16 is formed as a thin film at one surface side of the substrate film 15 and the adhesive layer 17 (photocurable resin layer) made of a photocurable resin in a semi-cured state is formed on the fine structure body 16, against the adherend 11 from an opposite surface side to the one surface side using the light guide 13 transparent to light; a curing step of curing the adhesive layer 17 by transmitting light through the light guide 13 with the substrate film 15 being pressed by the light guide 13; and a peeling separation step of releasing the pressing of the substrate film 15 and peeling fixed fine structure body 16 that is fixed to the adherend 11 through the cured adhesive layer 17 from the substrate film 15 while separating the fixed fine structure body 16 from fine structure body 16 on the substrate film 15 other than at a location fixed through the adhesive layer 17 such that the fixed fine structure body 16 is formed on the adherend as an antireflection optical body.

In the curing step, only a region of the fine structure body 16 formed on one surface side of the substrate film 15 which is provided with the UV curable resin 12 or the adhesive layer 17 and is irradiated with light transmitted through the light guide 13 is fixed to the adherend 11 with the cured UV curable resin 12 or the adhesive layer 17. The pressure on the optical film 14, 14a is then released by stopping pressing the substrate film 15 to separate the fine structure body 16 fixed to the adherend 11 from only a region of the optical film 14, 14a, which is provided with the UV curable resin 12 or the adhesive layer 17 and is irradiated with light transmitted through the light guide 13, thereby forming the fine structure body 16 as the antireflection optical body 16a on the adherend 11. Therefore, the fine structure body 16 can easily be formed only on a part of the adherend 11 by only adjusting the shape of the region to be coated with the UV curable resin 12 and the shape of the attached surface of the light guide 13 in the first embodiment and by only adjusting the shape of the attached surface of the light guide 13 in the second embodiment. In those embodiments, the adherend 11 is not necessarily fixed to the fine structure body 16 with an adhesive film therebetween unlike in Comparative Example 1; therefore, a thinner optical film can be obtained.

It should be noted that although this disclosure has been described based on the drawings and embodiment, a person in the relevant technical field could easily make various modifications and revisions based on the contents of this disclosure. Therefore, such modifications and revisions are also included within the scope of this disclosure.

REFERENCE SIGNS LIST

10: Component
11: Adherend
12: UV curable resin
13: Light guide
14, 14a: Optical film
15: Substrate film
16: Fine structure body
16a: Antireflection optical body
16p: UV curable resin layer 17: Adhesive layer
17*p*: UV curable resin layer
18: Clamp jig
21: Fine recess-protrusion layer
21*p*: UV curable resin layer
22: Inorganic film
23, 25, 26, 28: Roller
24: Sputtering target
27: Release film

The invention claimed is:

1. A display panel, in which a fine structure body is only partially formed by a method of forming an antireflection optical body, the method comprising:
   an application step of applying a photocurable resin onto one surface side of the display panel;
   a pressing step of pressing a substrate film having a fine structure body at one surface side thereof against the photocurable resin from an opposite surface side to the one surface side of the substrate film by a light guide transparent to light;
   a curing step of curing the photocurable resin by transmitting light through the light guide with the substrate film being pressed by the light guide to create a fixed fine structure body; and
   a peeling separation step of releasing the pressing of the substrate film and peeling the fixed fine structure body that is fixed to the display panel through the cured photocurable resin from the substrate film,
   wherein the fine structure body formed on one surface of the substrate film is divided into the fixed fine structure body that is fixed to the display panel and a remaining fine structure body remaining on the substrate film other than the fixed fine structure body, and
   the fine structure body has a first recess protrusion pattern on a first surface facing toward the substrate film and a second recess-protrusion pattern on a second surface opposite to the first surface.

* * * * *